United States Patent [19]

Haney

[11] 4,190,568
[45] Feb. 26, 1980

[54] MINERAL STABILIZED RESIN EMULSION

[76] Inventor: Fred H. Haney, 10216 Vultee Ave., Downey, Calif. 90241

[21] Appl. No.: 512

[22] Filed: Jan. 2, 1979

[51] Int. Cl.² .............................................. C08L 23/26
[52] U.S. Cl. ............................ 260/29.6 XA; 106/219; 106/243; 106/268; 106/271; 260/23 H; 260/23.5 A; 260/23.7 A
[58] Field of Search ............... 106/218, 219, 243, 268, 106/271; 260/23 S, 23 H, 23.5 A, 23.7 A, 29.6 XA, 29.7 M

[56] References Cited

U.S. PATENT DOCUMENTS

| | | | |
|---|---|---|---|
| 2,051,410 | 8/1936 | Kenney | 134/26 |
| 3,006,860 | 10/1961 | Heinz | 252/311.5 |
| 3,247,011 | 4/1966 | Higgins | 117/92 |
| 3,313,635 | 4/1967 | Wollek | 106/14 |
| 3,383,229 | 5/1968 | Conurt | 106/277 |
| 3,520,842 | 7/1970 | Crean | 260/23 H |

Primary Examiner—Paul R. Michl

[57] ABSTRACT

A mineral stabilized resin emulsion comprising a low to zero acid number hydrocarbon resin modified with an organic acid to the extent necessary for emulsification, a mineral stabilizer and a complexing agent such as an inorganic acid, a polyvalent metal ion or ammonium ion compound. A method for producing the mineral stabilized resin emulsion comprises subdividing the acid modified hydrocarbon resin by a combination of melting, mechanical and chemical dispersion in an aqueous medium and stabilizing the resultant dispersion by the addition of the complexing agent compatible with the resin and a hyrophillic mineral strabilizer such as bentonite clay. Accordingly, the hydrophillic mineral stabilizer orients to the aqueous portion of the emulsion and is coupled thereto by the complexing agent. The coupling action of the complexing agent is generally effected by a polyvalent metal ion such as chromium, iron, magnesium or aluminum, however, other ions such as ammonium ions are suitable for this purpose. In one embodiment form, the selected resin is pigmented or filled prior to emulsification thereby producing a more water resistant film at a modest cost.

12 Claims, No Drawings

MINERAL STABILIZED RESIN EMULSION

BACKGROUND OF THE INVENTION

This invention relates to a novel mineral stabilized resin emulsion which can be utilized as a decorative and/or protective surface coating. Further, the present invention provides a method for producing the emulsion by effecting a dispersion of an acid modified hydrocarbon resin in an aqueous medium and stabilizing the dispersion by the addition of a complexing agent compatible with the acid modified resin, and a mineral stabilizer such as bentonite clay.

Low to zero acid number hydrocarbon resins which heretofore have not been emulsified in the mineral colloid system are rendered capable of being emulsified in the present system by the addition of organic acid(s) soluble in them, and whose reaction products, with the aqueous complexing agent, has at least a slight solubility in water. Additionally these resins may advantageously be filled and/or pigmented prior to emulsification by any system.

Some prior emulsification processes have utilized colloidal clay-like materials for the emulsification and stabilization of asphalt emulsions. Although prior asphalt emulsions weather satisfactorily when applied to a base sheet, they are difficult to pigment and thus asphalt emulsions have generally been used in conjunction with an overlying decorative layer such as an acrylic coating. However, the use of acrylic coatings to cover asphalt emulsions has not met with complete success due to various differences in their individual properties, for example, differences in water absorption, toughness, softening points and variations in the co-efficients of thermal expansion. While acrylic coatings will suitably perform as a decorative/weather coating when used alone, the acrylic coatings are quite expensive and decompose at relatively low temperatures due to their relatively low flash points.

Moreover, these prior asphalt emulsions do not always attain an equilibrium condition within a relatively short time and as a result these emulsions may frequently undergo changes on aging. In this regard, many factors contribute to the stability of an emulsion including particle size, density of phase components and conditions of storage, such as temperature, agitation or evaporation during storage and use.

The drawbacks associated with prior asphalt emulsion and acrylic coating materials have led to the development of the present novel mineral stabilized resin emulsion which is similar to the prior asphalt emulsions in appearance but can be easily pigmented and used either by itself as a decorative weather coating, as an outer protective coating applied to an underlying asphalt emulsion, or applied as a coating to roofing paper and optionally surmounted with a granular material or other suitable surfacing agent. Further, the present mineral stabilized resin emulsion produces a dry emulsified film which is water resistant and more resistant to flow at elevated temperature.

SUMMARY OF THE INVENTION

Briefly, and in general terms, the present invention provides a novel mineral stabilized resin emulsion and a method for producing the emulsion of a low to zero acid number hydrocarbon resin modified with a suitable organic acid to the extent required for emulsification, a mineral stabilizer and a complexing agent such as an inorganic acid polyvalent metal or ammonium ion compound.

The present method comprises subdividing the acid modified petroleum hydrocarbon resin by a combination of melting, mechanical and chemical dispersion in an aqueous medium and stabilizing the resultant dispersion by the addition of the complexing agent and a hydrophilic mineral stabilizer such as bentonite clay. Accordingly, the hydrophillic mineral stabilizer orients to the aqueous portion of the emulsion and is coupled thereto by the complexing agent. The coupling action of the complexing agent is generally effected by a polyvalent metal ion such as chromium, iron, magnesium or aluminum, however, other ions such as ammonium ions are suitable for this purpose.

More specifically and in accordance with the present invention, the resin to be emulsified may be any hydrocarbon resin, wax or the like having an acid number too low to be emulsified by conventional emulsification methods, and plasticized with a suitable process oil, if necessary, whereby the resin has a softening point of about 80° F. to 150° F. and a penetration of about 40 to 190 dmm at 77° F. (ASTM D5). The softening point of the resin must be low enough to permit the resin to flow through the mineral stabilizer which surrounds the resin when the emulisified film is drying. While ambient drying temperatures are preferred, higher drying temperatures to produce forced drying of the film can be used.

Suitable organic acids for modifying the resin include benzoic acid, stearic acid, octanoic acid, napthenic acid, salicylic acid or the like and mixtures thereof. The organic acid is added to the resin in an amount of from about 0.2 to 2.0 percent by weight of the resin, which enables the resin to emulsify in the following described mineral colloid system.

The mineral stabilizer employed in the system may be composed of any montmorillonite mineral compound such as the bentonite or hectorite clay compounds. Bentonite and hectorite clay compounds are characteristically hydrophillic and swell, at least to some extent, on being contacted with water. The naturally occurring montmorillonites contain some silica, aluminum, sodium oxide, and magnesium compounds. Further, clays such as Hector clay and similar materials are also suitable for the stabilization of the present emulsion.

The complexing agents such as certain acids, polyvalent metal or ammonium ion compounds adjusts the aqueous resin-material stabilizer slurry and reacts with any excess stabilizer in the colloid system to form the present emulsion. More particularly, suitable acids for use as complexing agents in the present system include hydrochloric acid, sulfuric acid, acetic acid, phosphoric acid, chromic acid and mixtures thereof. Suitable polyvalent metal ion compounds for use as complexing agents include sodium or potassium dichromate, alum (aluminum sulfate), aluminum chloride, calcium chloride, magnesium sulfate, sodium aluminate, ferric chloride and mixtures thereof. Another class of complexing agents which can be used for the emulsion and which improve the water resistance of the dried emulsified films are quaternary ammonium salts such as ammonium chloride.

The choice of the complexing agent used to adjust the aqueous resin-mineral stabilizer slurry will depend upon the selected organic acid used to initially modify the hydorcarbon resin. In this regard, the resultant reaction product which forms upon reaction of the complexing agent with organic acid modified resin must have some water solubility. For example, an aluminum salt should not be used as a complexing agent if stearic acid is chosen as the acid for modifying the resin since the resultant reaction product, aluminum stearate, is insoluble in water.

Accordingly, suitable complexing agents will make the resultant dried emulsified films more water resistant and when proper proportions are utilized, the emulsion will form without the addition of further adjusting materials to the mineral stabilizer slurry.

It has been found in accordance with the present invention that a more water resistant emulsified film is produced when at least a portion of a pigment or a filler is put into the resin before emulsification. An additional benefit from this procedure is the reduced cost of the emulsification system since, generally speaking, certain pigments and fillers are less expensive than the resin to be emulsified. In this regard, if the addition of a pigment and a filler is desired, it is not necessary that the filler and/or a pigment used either in the resin or in the aqueous portions be identical. Suitable pigmentary agents are those customarily used in decorative coatings and include titanium dioxide, organic and earth pigments and suitable fillers include silica flour, rock dust, clays and the like. Additional, pigments can be added to the water phase after emulsification if desired. Further quaternary tallow amine compounds such as Arquad 2HT-75 (supplied by the Armour Co.) Adogen 442 (supplied by the Ashland Chemical Co.) and other similar agents may be added to the resin to aid in the dispersion of the pigment and release of air from the emulsion. The addition of butyl rubber or other similar agents which degrade over time to help plasticize the emulsied film may also be included in the emulsion to prevent age hardening of the resultant film due to oxidation.

The above and other objects and advantages of this invention will become more apparent from the following more detailed description, when taken in conjunction with the accompanying specific examples.

DESCRIPTION OF THE PREFERRED EMBODIMENTS

The present invention provides a novel mineral stabilized resin emulsion of materials not heretofore emulsified in a clay or mineral colloid system. In more detail, the present emulsion comprises a hydrocarbon resin modified with a suitable organic acid, a mineral stabilizer and a complexing agent. A method for producing the mineral stabilized emulsion comprises subdividing the acid-modified hydrocarbon resin by a combination melting, mechanical and chemical dispersion in an aqueous medium and stabilizing the resultant dispersion by the addition of the complexing agent compatible with the acid-modified resin and a hydrophillic mineral stabilizer such as bentonite clay. The complexing agent is generally a compound containing a polyvalent metal ion such as chromium, iron, magnesium or aluminum, however, other ions such as ammonium ions are suitable for this purpose.

In accordance with the present invention, the resin to be emulsified may be any low to zero acid number hydrocarbon resin or wax plasticized with a suitable process oil, if necessary, whereby the resin has a softening point of about 80° F. to 180° F. and penetration at (ASTM D5) 77° F. of about 40 to 190 ddm. Typically, the mineral stablized resin emulsion will include quantities of resin from about 35 to about 65 percent by weight. The softening point of the resin must be low enough to permit the resin to flow through the mineral stabilizer which surrounds the resin when the emulsified film is drying. While ambient drying temperatures are preferred, higher drying temperatures to produce forced drying of the film can be used. Typical resins and waxes include hydrocarbon resins, rubbers, polyethylene, low molecular weight polypropylene, alpha methyl styrene, beeswax, paraffin, microcrystalline wax, carnauba wax, stabalite esters, coaltar resins, estergums, and the like. If the emulsion is to be used as a roofing coating, the resin to be emulsified will preferably also have a high flash point, for example, greater than about 500° F. so that the resultant emulsified film will pass the industry established resistance to fire test requirements for roofing use. Hydrocarbon resins which have been used for this purpose are "BY29-50" and "Pavebrite 90" supplied by the Neville Chemical Company, Pittsburgh, Pennsylvania. Those skilled in the art will readily appreciate that the oil used to plasticize the resin will generally be compatible with the selected resin. Thus, if an aromatic resin is chosen, the plasticizing oil will also preferably have an aromatic structure or other compatible structure.

At times the resin to be used is darker than is desireable and may require so much pigment that, if it is all added to the aqueous portion of the emulsion, it may cause an undesireable reduction in water resistance. It has been found that a part or all of the pigment, a filler or combinations of pigments and fillers can be incorporated in the resin before emulsification.

Suitable organic acids for solubilizing the hydrocarbon resin include benzoic acid, salicylic acid, napthenic acid, stearic acid, octanoic acid or other organic acids which are soluble in the resin. Accordingly, as a preliminary step prior to emulsification, the organic acid is added to the resin in an amount of from about 0.2 to 2.0 percent by weight of the resin, which permits the resin to emulsify in the following described mineral colloid system.

The mineral stabilizer employed in the present system may be composed of any montmorillonite mineral compound such as the bentonite or hectorite clay compounds. The stabilizer is added in an amount of from about 2 to 5 percent by weight of the emulsion. Bentonite and hectorite clay compounds are characteristically hydrophillic and swell, at least to some extent, on being contacted with water. The naturally occurring montmorillonites contain some silica, aluminum, sodium oxide, and magnesium compounds. Further, clays such as Hector clay and similar materials are also suitable for stabilization of the present emulsion.

The complexing agent such as certain acids or polyvalent metal ion compounds added to the clay slurry in an amount of from about 0.1 to 0.2 percent by weight adjusts the aqueous resin-mineral stabilizer slurry and reacts with any excess stabilizer in the colloid to form the present emulsion system. Suitable acids for use as complexing agents in the present system include hydrochloric acid, sulfuric acid, acetic acid, phosphoric acid, chromic acid and mixtures thereof. Suitable polyvalent metal ion compounds for use as complexing agents include sodium or potassium dichromate, alum (aluminum sulfate), aluminum chloride, calcium chloride, magnesium sulfate, sodium aluminate, ferric chloride and mixtures thereof. Another class of complexing agents which can be used for the emulsion and which improve the water resistance of the dried emulsified films are quaternary ammonium salts such as ammonium chloride.

The choice of the complexing agent used to adjust the aqueous resin-clay slurry, will depend upon the organic acid used to modify the hydrocarbon resin. In this regard, the resultant reaction product which forms upon reaction of the complexing agent with the organic acid modified resin must have some water solubility, typically on the order of at least about 0.02 gm/100 gms of water. For example, an aluminum salt should not be used for as the complexing agent if stearic acid is chosen for modifying the resin since the resultant reaction product, aluminum stearate, is insoluble in water.

The complexing agents used in the present emulsion make the resultant dried emulsified film less water sensitive and when proper proportions are utilized the emulsion will form without the addition of further adjusting materials to clay slurry. It is thought that the complexing agent acts to couple the mineral stabilizer to the dispersed acid modified resin by the formation of a Werner complex. While the present invention is not to be limited by this explanation, the formation of the Werner complex appears to be the best theory available at the present time for explaining the mechanism which produces the resultant mineral stabilized resin emulsion.

Referring to the present mineral colloid emulsification system, the anions derived from the organic acid modified resin do not react with the anions derived from the mineral stabilizer slurry in the system unless they are promoted by a source of cations.

Accordingly, the complexing agent in the present emulsification system supplies this source of cations which coordinate a number of water molecules upon hydrolysis in the aqueous medium. Apparently, the anions derived from the organic acid modified resin and bentonite clay slurry replace the already attached anions and become coordiantely bound to the cations of the complexing agent. In effect, the complexing agent acts to couple or bridge the mineral stabilizer, bentonite clay, to the dispersed acid-modified resin via the aforementioned Werner complex thereby producing the present mineral stabilized resin emulsion.

For a further discussion of this theoretical principle which is analogous to the coordinate role of alum in the sizing of paper, see for example, Strazdins, E. "Critical Phenomenon in the Formation of the Resin-Aluminum Sizing Complex" reprinted from Tappi, Vol. 48, No. 3, March 1965, A. W. Thomas in "Tech. Association Papers 18: 242–245 (1953)" and A. W. Thomas "Colloid Chemistry" 161–164, New York, McGraw Hill, 1934.

In one embodied form, the resin is pigmented or filed prior to emulsification by adding a suitable pigmenting agent such as titanium dioxide, organic or earth pigments and/or suitable fillers such as silica flour, rock dust, ball clay, Kaolin clay, Dixie clay and the like. Further, additional pigment can be added to the aqueous phase after emulsification if desired. It has been found in accordance with the present invention that a more weather resistant emulsified film is produced when at least a portion of a pigment or a filler is put into the resin before emulsification.

An additional benefit from this procedure is the reduced cost of the emulsification system since, generally speaking, many pigments and fillers are less expensive than the resin to be emulsified. In this regard, if the addition of a pigment and a filler is desired, it is not necessary that the filler and a pigment suspended in either the resinous portion or the aqueous portion be identical. Suitable pigmentary agents include titanium dioxide organic and earth pigments such as zinc oxides, iron oxides, lead oxides, etc. or other conventional pigments and the like. Suitable fillers include silica flour, rock dust burned clays and the like. Additional pigment or filler can be added to the aqueous phase after emulsification if desired.

Further compounds such as aluminum fluoride, calcium chloride, calcium fluoride or similar salts may be added to emulsion to to improve the water resistance of the resultant dried film from the emulsion. The addition of butyl rubber or other similar agents which degrade over time to help plasticize the emulsied film may also be included in the resin to prevent age hardening of the resultant film due to oxidation. Additions of from about 0.05 to 0.2 percent by weight of calcium chloride, calcium fluoride or similar agents to the aqueous phase or the addition of certain amines to the resin improves the water resistance of the dried emulsified film. The amines may act as surface active agents when included in the emulsion to aid in the incorporation of the pigment and reduction of air bubbles in the resultant dried film. Quaternary tallow amine compounds, such as Arquad 2 HT-75 (supplied by Armour Company) and Adogen 442 (supplied by Ashland Chemical Company.) are such amine which can be added to the resin before making the emulsion.

Dried films of these resin emulsions without pigment or filler based on the aforedescribed emulisification clay system are clear because the refractive indices of the mineral stablizer and resin are relatively close to each other. The emulsions will burn in place. The resin can be extracted with solvent leaving a clay structure indicating that a type of clay emulsion has been effected.

In a presently preferred embodiment, a method for preparing the mineral stabilized emulsion comprises subdividing the organic acid modified hydrocarbon resin by a combination of melting, mechanical and chemical dispersion in an aqueous medium and stabilizing the resultant dispersion by the addition of the complexing agent compatible with the acid modified resin to couple the mineral stabilizer, such as bentonite clay.

Generally, the resin is heated above its softening temperature but below its flash point for example to about 180° F. to 280° F. and the selected organic acid for modifying the resin is stirred into the resin, by the action of a mechanical blender such as a pony mixer, ribbon mixer, Charlotte colloid mill, Lancaster colloid mill or the like.

Depending on the softening point of the resin, the clay slip may be heated to 140° F. to 160° F., however, if about ⅓ to ½ of the clay slip is put into the mixing container there is usually enough heat from the resin to bring about emulsification as the parts are mixed together. The balance of the ingredients are added proportionately over a short time period e.g. 5 to 15 minutes. It is preferable to stir and cool the finished emulsion to keep the particle size from growing. Whipping the cold emulsion can reduce the particle size. The usual water content of a finished emulsion runs from about 35 to 55 percent.

The mineral stabilizer is sifted into a portion of water contained in a mechanical mixer and allowed to form a slurry. The complexing agent is added to the slurry in the form of a solution made with the remaining quantity of water, thereby forming the emulsifier. The melted acid modified resin mixture is slowly poured into approximately one half of the emulsifier during continued stirring. The balance of the emulsifier and acidified resin are then slowly added over a period of about five minutes until the entire amounts are added and emulsified. The emulsion is stirred and allowed to cool to room temperature, and subsequently dried.

Of course, those skilled in the art will appreciate that other methods of manufacture can be utilized for preparing the mineral stabilized resin emulsion. Typically, these methods are employed in the conventional batch and continuous preparation of asphalt emulsions by manufacturers such as Charlotte Mills and Lancaster Mills.

In accordance with the present invention the following examples will illustrate the preferred method of making the mineral stabilized resin emulsion comprising a resin to be emulsified, an organic acid for modifying the resin, a mineral stabilizer and a complexing agent, which are dispersed in an aqueous medium to form the emulsion and subsequently allowed to dry.

EXAMPLE 1

99.6 grams of a hydrocarbon resin having a softening point of about 110° F. was heated to a temperature of about 220° F. and 0.4 grams of benzoic acid was stirred into the resin for several minutes, thereby forming an acid modified resin for the emulsion.

In a separate mixing vessel, approximately 50 grams of water was agitated and about 5 grams of bentonite clay (Volclay #200) was sifted into the water to form a slurry mixture. Approximately 0.25 grams of alum (aluminum sulfate) was made into a solution with about 44.8 grams of water. The alum solution was subsequently added to the bentonite clay slurry mixture, thereby forming an emulsifier having a total weight of about 100 grams.

Approximately one half of the emulsifier solution was then poured into another clean container and the acid modified resin was added to the clay slurry mixture with continued stirring. The resultant solution became warm and at about 150° F. the mixture emulsified. The balance of the emulsifier and acid modified resins were then slowly added over about a period of about five minutes until the entire amounts were added and emulsified. Subsequently, the emulsion was stirred and allowed to cool. The particle size of the emulsion was determined to be on the order of from about 4 microns to about 40 microns.

The weatherability of the resultant emulsion can be enhanced by the addition of pigments, fillers, butyl rubber or other good water proofing agents which are incorporated into the resin prior to emulsification. The following Examples 2–6 are illustrative of this embodied feature.

EXAMPLE 2

Approximately 1.0 gram of stearic acid was added to a resin mixture containing about 91.6 grams of hydrocarbon resin (BY29-50Neville Chemical), 2 grams butyl rubber, Epolen (C17) and 0.4 grams of a dispersion agent (Arquad 2HT-75, Armour Company) which was stirred and heated to a temperature of about 210° F. Approximately 100 grams of titanium dioxide was dispersed into the melted resin with continued stirring.

An emulsifier was prepared in accordance with the procedure of Example 1 containing 4.8 grams of bentonite clay, 95 grams of water and approximately 0.2 grams of ammonium chloride. Subsequently, the acid modified resin was added to the warm emulsifier solution with continued stirring to produce the emulsion.

Approximately one half of the emulsifier was heated to a temperature of about 150° F. and the acid modfied resin was added to the warm emulsifier solution and allowed to emulsify. After initial emulsification, the balance of the resin and emulsifier were mixed together with continued stirring in equal portions. The mixture continued to emulsify and cool to room temperature with continued stirring.

EXAMPLE 3

The procedure of Example 1 was repeated using 56.6 grams of melted hydrocarbon resin, about 1.0 gram of benzoic acid, 2.0 grams of butyl rubber, 0.4 grams Arquad 2HT-75 in which about 40.0 grams of titanium dioxide was dispersed at a temperature of about 200° F.

An emulsifier was prepared from the following materials in accordance with the procedure of Example 1.
Bentonite clay: 5.0 grams
Water: 94.8 grams
Alum (Aluminum sulfate): 0.2 grams The following examples are pigmented mineral stabilized resin emulsions containing varying amounts of titanium dioxide as the pigmenting agent. Again the procedure of Example 1 was substantially repeated but modified by adding approximately two-thirds of the titanium dioxide pigment into the resin before emulsification. The remainder of the pigment was suspended in the aqueous emulsifier.

In order to pigment the present mineral stabilized emulsion, titanium dioxide should be added in an amount of about 40% by weight based on the resin, which will yield an initial brightness of 67 and will darken somewhat prior to the start of chalking but produces a relatively light colored coating.

These and other considerations will be better understood from a review of the following chart which is a summary of the emulsions prepared in accordance with the present invention by the procedures specified in Example 1.

|  | Example 4 | | Example 5 | | Example 6 | |
| --- | --- | --- | --- | --- | --- | --- |
|  | Gm. | Wt. % | Gm. | Wt. % | Gm. | Wt. % |
| PAVEBRITE 90 | 372.6 | 37.21 | 554.4 | 28.34 | 458.7 | 23.55 |
| Arquad 2HT-75 | 0.8 | 0.08 | 1.1 | 0.05 | 0.9 | 0.05 |
| Ti-Pure R-900 (Du Pont) | 123.0 | 12.28 | 365.9 | 18.71 | 458.7 | 23.55 |
| Stearic Acid | 3.8 | 0.38 | 5.6 | 0.29 | 4.6 | 0.24 |
| Water | 475.0 | 47.44 | 977.0 | 49.95 | 973 | 49.95 |
| Bentonite | 25.0 | 2.50 | 50.0 | 2.56 | 50 | 2.57 |
| Ammonium Chloride | 1.0 | 0.10 | 2.0 | 0.10 | 2 | 0.10 |

The following chart are further examples of mineral stabilized asphalt and resin emulsions of the present invention. It being understood that the components of the emulsions were blended substantially in accordance with the procedure set forth in Example 1.

| Example | Complexing Agent | Complexing Agent Amt. | pH | Sentonite Gm. | Condition of Emulsion |
| --- | --- | --- | --- | --- | --- |
| 7 | NH4Cl | 0.372 | 8.0 | 9.8 | Good |

-continued

| Example | Complexing Agent | Complexing Agent Amt. | pH | Sentonite Gm. | Condition of Emulsion |
|---|---|---|---|---|---|
| 8 | $(NH_4)_2SiF_6$ | 0.372 | 4.6 | 4.6 | Good Thick |
| 9 | $NH_4OH$ | 0.372 | 9.8 | 9.8 | Good Thin |
| 10 | $K_2Cr_2O_7$ | 0.372 | — | 7.0 | Good |
| 11 | $K_2Cr_2O_7$ | 0.372 | 6.15 | 5.0 | Broke at 300 gm. addition |
| 12 | $K_2Cr_2O_7$ | 0.372 | — | 5.0 | Good Black Large Particle Size |
| 13 | $Al_2(SO_4)_3$ | 0.08 | — | 8.0 | Broke at 100-150 gm. Asphalt |
| 14 | $Al_2(SO_4)_3$ | 0.0192 | — | 10.0 | Good |
| 15 | $Al_2(SO_4)_3$ | 0.02 | — | 10.0 | Good |
| 16 | $Al_2(SO_2)_3$ | 0.02 | 7.3 | 10.0 | Good, Emulsion Easy to Make |
| 17 | $H_2SO_4$ | 0.0965 | 5.9 | 10.0 | Good, Emulsified Easily |
| 18 | $H_2SO_4$ | 0.0965 | 5.9 | 10.0 | Good, Emulsified Easily |
| 19 | $AlCl_3$ | 0.08 | 6.0 | 12.0 | Good |

| Ex. | Complexing Agent Meq | Gm | Resin* | Meq | % | Bentonite MEQ | Remarks |
|---|---|---|---|---|---|---|---|
| 7 | 13.91 | A 295.4 | 7.4 | 59.6 | 7.3 | — | |
| 8 | 9.3 | A 317.8 | 7.9 | 60.7 | 7.3 | — | |
| 9 | — | A 317.8 | 7.9 | 60.7 | 7.3 | — | |
| 10 | 2.53 | A 293.4 | 7.4 | 58.8 | 5.2 | | $K_2Cr_2O$ = 2 Equivalents or 6.79 MEQ/gm |
| 11 | 2.53 | A 300 | 7.5 | 60.0 | 3.8 | — | |
| 12 | 2.53 | A 308.7 | 7.7 | 59.6 | 3.8 | — | |
| 13 | 1.4 | A 100 150 | 2.5 | — | 5.6 | — | |
| 14 | .35 | A 314 | 7.9 | 61.1 | 7.45 | — | |
| 15 | .35 | A 301.4 | 7.5 | 60.3 | 7.45 | — | |
| 16 | .35 | A 301.4 | 7.5 | 60.3 | 7.45 | | Alum added before clay |
| 17 | — | B 307.5 | 25.2 | 60.9 | 7.45 | | By 2950 Resin + 1% Benzoic acid |
| 18 | — | B 253.6 | — | 55.9 | 7.45 | | Ran out of Resin |
| 19 | 1.8 | B 200 | 6.6 | 33.0 | 8.9 | — | |

*A = Mixture of Hydrocarbon Resins (avg. melting pt. 85° F.)
B = Petroleum Hydrocarbon Resin (By 29-50)

| Example | Complexing Agent | Complexing Agent Amt. | PH | Bentonite Gm. | Condition of Emulsion |
|---|---|---|---|---|---|
| 20 | $CaCl_2$ | 0.14 | — | 12.0 | Good |
| 21 | $FeCl_3$ | — | — | 12.0 | Good |
| 22 | $K_2Cr_2O_7$ | 0.48 | 6.4 | 7.0 | Good |
| 23 | $MgSO_4 7H_2O$ | 1.00 | 8.2 | 7.0 | Good |
| 24 | $K_2Cr_2O_7$ | 0.156 | 7.2 | 10.2 | Good |
| 25 | $K_2Cr_2O_7$ +$CrO_3$ | 0.156 | 6.3 | 10.2 | Good |
| 26 | $K_2Cr_2O_7$ | 0.156 | 6.5 | 10.2 | Good |
| 27 | $CrO_3$ | 0.0228 | | | |
| | $K_2Cr_2O_7$ | 0.0066 | — | 12.0 | Good |
| 28 | $CrO_3$ | 0.119 | | | |
| | $K_2Cr_2O_7$ | 0.0066 | 6.4 | 12 | Good |
| 29 | $H_2SO_4$ | 0.145 | 4.2 | 10 | Good |
| 30 | $H_2SO_4$ and more | 0.0193 | 7.7 | 10 | Good |
| 31 | $NH_4Cl$ | 0.4 | — | 9.8 | Good |

| Ex. | Complexing Agent Meq | Gm | Resin* Meq | % | Bentonite MEQ | Remarks |
|---|---|---|---|---|---|---|
| 20 | 2.5 | B 200 | 6.6 | 33.0 | 8.9 | — |
| 21 | — | B | 6.6 | 33.0 | 8.9 | — |

-continued

| Ex. | Complexing Agent Meq | Gm | Resin* Meq | % | Bentonite MEQ | Remarks |
|---|---|---|---|---|---|---|
| 22 | 3.26 | 200 A | 6.3 | 55.5 | 5.2 | K₂Cr₂O₇ 6.79 MEQ/gm |
| 23 | 8.1 | 250 A | 6.3 | 57.1 | 5.2 | — |
| 24 | 1.06 | 266 A | 7.4 | 59.7 | 7.6 | — |
| 25 | 1.06 | 296.5 A | 7.5 | 60.0 | 7.6 | CrO₃ = 2 Equivalents |
| 26 | 1.06 | 299.5 A | 7.5 | 60.0 | 7.6 | or 20 MEQ/gm |
| 27 | 1.46 | 299.8 A | 6.5 | 565 | 8.9 | — |
| 28 | .05 7.1 | 260 A | 6.5 | 565 | 8.9 | — |
| 29 | .3 2.54 | 260 A | 7.9 | 61.1 | 7.45 | H₂SO₄ Forms Alum |
| 30 | .34 | 3146 A | 9.9 | 60.6 | 7.45 | H₂SO₄ Forms Alum |
| 31 | + 14.9 | 308.0 B 205.4 | — | 50.7 | 7.3 | By 29 resin + 5% Epolene C-17 + .4% Arquad 2H 7 = 75 + 1% Stearic Acid |

*A = Mixture of Hydrocarbon Resins - avg. melting pt. 85° F.
B = Petroleum Hydrocarbon Resin (By 29–50)

The resultant emulsion can be made and used over a wide pH range, including acidic pH values. Accordingly, pH values from about 10 to about 2.0 are operable, however, slips having pH values below 6 make emulsions having a more water resistant dried film than those of a higher pH. Further it is not necessary for a cationic material to be incorporated into the present emulsification system. While some cationic materials can be added to the resin portion, such materials will be added as an aid for the incorporation of pigments and the like and have been found to reduce the air bubble content of the finished emulsified film. Cationic dispersants such as those previously described herein also improve the water resistance of the emulsified film. Also, solvents are not needed in the present emulsification process.

The term, acid number, is used herein in its conventional trade usage to designate the number of milligrams of potassium hydroxide required to neutralize the free fatty acids in 1 gm. of resin or wax. The determination is performed by titrating an alcohol solution of the wax or resin with tenth or half-normal alkali, using phenolphthalein as indicator. Accordingly, a low acid number resin, as used herein, connotes a resin or wax with an acid number too low to be emulsified by prior known methods of emulsification.

It will be apparent from the foregoing that, while particular forms of the invention have been illustrated and described, various modifications can be made without departing from the spirit and scope of the invention. Accordingly, it is not intended that the inventions be limited except by the appended claims.

I claim:
1. A mineral stabilized resin emulsion formed as an aqueous slurry consisting essentially of:
   (i) about 35 to about 65 percent by weight of a material selected from the group consisting of low to zero acid number hydrocarbon resins having a softening point above about 80° F. and penetration within a range of from about 40 dmm to 190 dmm at 77° F.,
   (ii) about 0.2 to about 2.0 percent by weight of at least one component selected from the group consisting of benzoic acid, stearic acid, octanoic acid, napthenic acid, salicylic acid and mixtures thereof for solubilizing said hydrocarbon resin,
   (iii) about 2.0 to about 5.0 percent by weight of a mineral stabilizer selected from the group consisting of montmorillonite mineral compounds, clays, and mixtures thereof, and
   (iv) about 0.1 to about 4.0 percent by weight of a complexing agent selected from the group consisting of hydrochloric acid, sulfuric acid, acetic acid, phosphoric acid, chromic acid, sodium dichromate, potassium dichromate, aluminum sulfate, aluminum chloride, calcium chloride, magnesium sulfate, sodium aluminate, ferric chloride, ammonium chloride and mixtures thereof;
   (v) about 35 to about 55 percent by weight water;
   the water solubility of the reaction product formed upon reaction of said complexing agent with the solubilized hydrocarbon resin i) being at least about 0.02 gms. per hundred grams of water.

2. A mineral stabilized resin emulsion as defined in claim 1 wherein the hydrocarbon resin includes a pigmenting agent prior to forming said aqueous slurry.

3. A mineral stabilized resin emulsion as defined in claim 1 wherein the hydrocarbon resin includes a filler prior to forming said aqueous slurry.

4. A mineral stablized resin emulsion as defined in claim 1 wherein the hydrocarbon resin includes up to 5 percent by weight butyl rubber.

5. A mineral stabilized resin emulsion as defined in claim 1 further including an effective amount of a dispersing agent.

6. A mineral stabilized resin emulsion as defined in claim 1 wherein said hydrocarbon resin is plasticized with a suitable oil.

7. A mineral stabilized resin emulsion as defined in claim 1 wherein the hydrocarbon resin is selected from the group consisting of rubbers, polyethylene, low molecular weight polypropylene, alpha methyl styrene, beeswax, paraffin, microcrystaline wax, carnuba wax, stabalite esters, coal tar resins, estergums, or mixtures thereof.

8. A mineral stablized resin emulsion as defined in claim 1 wherein said mineral stabilizer is selected from the group consisting of Bentonite clays, Hectorite clays, and mixtures thereof.

9. A mineral stabilized resin emulsion as defined in claim 2 wherein said pigmenting agent is titanium dioxide.

10. A mineral stabilized resin emulsion as defined in claim 2 wherein said pigmenting agent is selected from the group consisting of organic pigments, earth pigments, chalk pigments and mixtures thereof.

11. A mineral stabilized resin emulsion as defined in claim 3 wherein said filler is selected from the group consisting of silica flour, rock dust, clays and mixtures thereof.

12. A mineral stabilized resin emulsion as defined in claim 5 wherein said dispersing agent is incorporated into the resin prior to emulsification said agent selected from the group consisting of calcium chloride, calcium fluoride, quaternary tallow amines, and mixtures thereof.

* * * * *

UNITED STATES PATENT AND TRADEMARK OFFICE
CERTIFICATE OF CORRECTION

PATENT NO. : 4,190,568
DATED : February 26, 1980
INVENTOR(S) : Fred H. Haney

It is certified that error appears in the above—identified patent and that said Letters Patent is hereby corrected as shown below:

Column 2, line 49, "material" should read -- mineral --.

Column 6, line 19, "emulsied" should read -- emulsified --.

Column 8, 4th column in graph after line 63, "Sentonite" insert -- Bentonite --.

Column 9, in second graph under Remarks, the formula "$K_2Cr_2O$" should read -- $K_2Cr_2O_7$ --.

Signed and Sealed this

Fourteenth Day of October 1980

[SEAL]

Attest:

SIDNEY A. DIAMOND

Attesting Officer

Commissioner of Patents and Trademarks